United States Patent
Chambers

(10) Patent No.: US 9,356,497 B2
(45) Date of Patent: May 31, 2016

(54) VARIABLE-OUTPUT GENERATOR FOR DOWNHOLE POWER PRODUCTION

(75) Inventor: Larry DeLynn Chambers, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/117,288

(22) PCT Filed: Aug. 30, 2012

(86) PCT No.: PCT/US2012/053093
§ 371 (c)(1),
(2), (4) Date: Mar. 10, 2015

(87) PCT Pub. No.: WO2014/035397
PCT Pub. Date: Mar. 6, 2014

(65) Prior Publication Data
US 2015/0180320 A1 Jun. 25, 2015

(51) Int. Cl.
*H02K 21/02* (2006.01)
*E21B 41/00* (2006.01)
*H02K 7/18* (2006.01)
*H02P 9/14* (2006.01)

(52) U.S. Cl.
CPC .......... *H02K 21/023* (2013.01); *E21B 41/0085* (2013.01); *H02K 7/1807* (2013.01); *H02P 9/14* (2013.01)

(58) Field of Classification Search
CPC .................................................. E21B 41/0085
USPC .............................. 166/66.5; 290/1 R, 43, 54
See application file for complete search history.

(56) References Cited

U.S. PATENT DOCUMENTS

| | | | |
|---|---|---|---|
| 6,943,478 B2 * | 9/2005 | Zepp et al. | 310/191 |
| 7,451,835 B1 * | 11/2008 | Hall et al. | 175/107 |
| 2001/0040379 A1 | 11/2001 | Schultz et al. | |
| 2003/0057792 A1 * | 3/2003 | Yang | 310/191 |
| 2006/0049712 A1 * | 3/2006 | Zepp et al. | 310/191 |
| 2006/0086498 A1 | 4/2006 | Wetzel et al. | |
| 2006/0181172 A1 * | 8/2006 | Naitou et al. | 310/209 |
| 2008/0265702 A1 * | 10/2008 | Yeh | 310/90 |

FOREIGN PATENT DOCUMENTS

| | | |
|---|---|---|
| WO | 9937017 A1 | 7/1999 |
| WO | 2011020978 A1 | 2/2011 |

OTHER PUBLICATIONS

International Search Report and Written Opinion for PCT/US2012/053093 dated Oct. 9, 2013.

\* cited by examiner

*Primary Examiner* — Tulsidas C Patel
*Assistant Examiner* — Sean Gugger
(74) *Attorney, Agent, or Firm* — McDermott Will & Emery LLP; Benjamin Fite

(57) ABSTRACT

Methods and systems of downhole power generation are disclosed. The method includes the steps of rotating a magnet assembly about an axis relative to a coil assembly at a first rotational velocity, axially moving the magnet assembly to a first position on the axis with a configurable actuator so as to adjust a magnetic interaction between the magnet assembly and the coil assembly, and providing a power output from the coil assembly at a first power output level corresponding to the first position while the magnet assembly is rotating at the first rotational velocity.

21 Claims, 6 Drawing Sheets

VARIABLE-OUTPUT GENERATOR FOR DOWNHOLE POWER PRODUCTION

BACKGROUND

This application is a National Stage entry of and claims priority to International Patent Application No. PCT/US2012/053093, filed on Aug. 30, 2012.

The present invention relates generally to downhole power generation systems and methods and, more particularly, to downhole power generation systems and methods that utilize a variable-output generator to generate electrical power.

Modern hydrocarbon drilling and production operations can often require that electrical power be supplied to equipment in the downhole environment. For example, electrical power is required downhole for a number of applications, including well logging and telemetry. Well logging of the borehole often includes the use of active sensors that require power to obtain information about the downhole environment. Such information will typically include the various characteristics and parameters of the earth formations traversed by the borehole, data relating to the size and configuration of the borehole itself, pressures and temperatures of ambient downhole fluids, and other downhole parameters. Telemetry commonly utilizes electrical power to relay data acquired from various logging sensors in the downhole environment to the surface.

Supply and generation of power downhole can be problematic for a number of reasons. Storage of power in certain regions of the wellbore can be problematic due to high temperatures and other harsh conditions that conventional batteries and capacitors cannot withstand. Generation of power downhole can be accomplished by using the circulating drilling mud to operate a generator or turbine located downhole. At least one problem with this approach is that mud flow rates can vary widely and the mud flow may need to be increased, for example when the drill bit enters a new type of subterranean strata. As the flow rate becomes excessively high, significant issues can be encountered. First, at high flow rates, the increased rotational rate produces high torques within the generator that can lead to its mechanical failure. Second, at high flow rates, more power can be generated than is necessary for the intended application. This excess power generation can lead to heat production, which can be detrimental to electronic components in the drill string. Additionally, due to the potential extreme flow rates that the circulating mud may attain, any such generator or turbine is typically oversized relative to the nominal requirement for power. The increased size of the generator or turbine leads to lower than optimal efficiency and increased cost.

A conventional approach to generating a constant amount of power when the mud flow must be increased is to pull the downhole generator and reconfigure the turbine to operate at the higher mud flow rate. Pulling, modifying, and re-inserting the downhole power generator requires a significant amount of time, thereby incurring an operational cost and delaying the drilling operation. There is currently no adequate resolution for this issue in regions of the wellbore in which power currently cannot be satisfactorily stored or delivered.

SUMMARY OF THE INVENTION

The present invention relates generally to downhole power generation systems and methods and, more particularly, to downhole power generation systems and methods that utilize a variable-output generator to generate electrical power.

In certain aspects, a method of downhole power generation is disclosed. The method includes rotating a magnet assembly about an axis relative to a coil assembly at a first rotational velocity, axially moving the magnet assembly to a first position on the axis to adjust a magnetic interaction between the magnet assembly and the coil assembly, and providing a power output from the coil assembly at a first power output level corresponding to the first position while the magnet assembly is rotating at the first rotational velocity.

In certain aspects, a downhole power generator is disclosed that includes a coil assembly arranged about a longitudinal axis within a housing and having a power output exhibiting a power output level and a magnet assembly movably arranged within the housing with respect to the coil assembly. The magnet assembly is configured to rotate about the longitudinal axis at a rotational velocity and to translate axially along the longitudinal axis within a range of positions. The power generator also includes an actuator selectably configured to urge the magnet assembly in at least a first direction along the longitudinal axis. The actuator is further configured to move the magnet assembly to any axial position within the range, wherein the power output level depends at least partially on an axial position of the magnet assembly.

In certain aspects, a downhole power generation system includes a mud-driven power supply positioned along a drill string. The mud-driven power supply is operable to rotate in response to a flow of drilling mud through the drill string. A rotor is coupled for rotation with the power supply. A stator is arranged relative to the rotor such that rotation of the rotor with respect to the stator generates an electrical power output. An actuator is coupled to one of the rotor and the stator. The actuator is operable to change a relative position of the rotor and the stator with respect to one another to adjust the electrical power output without interrupting rotation of the rotor with respect to the stator.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

Figure 1:
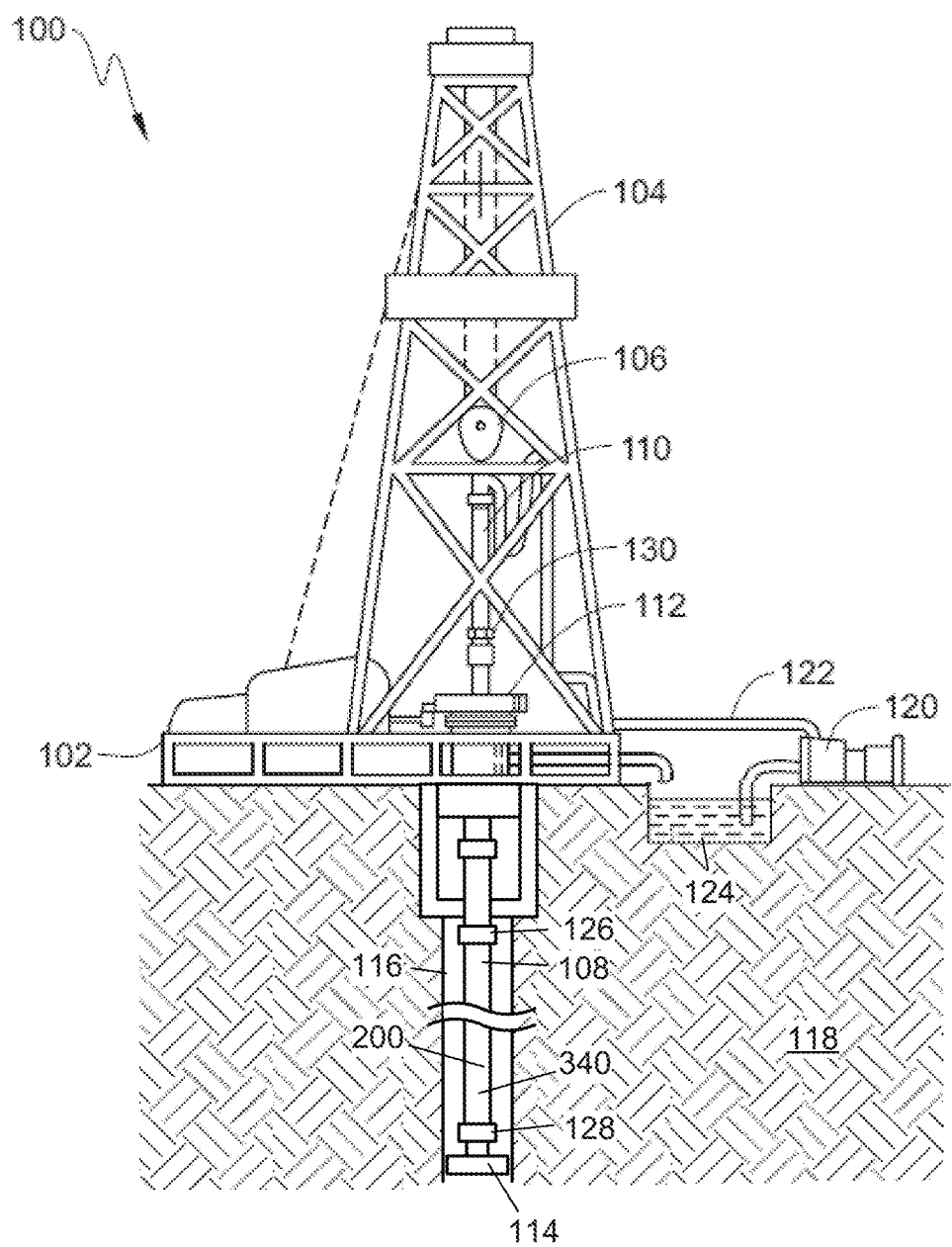
FIG. 1 illustrates a land-based oil and gas rig including a downhole power generator that may be employed to provide power to downhole electronics, according to the one or more embodiments.

While certain embodiments and aspects of the subject technology are depicted in the drawings, those skilled in the art will appreciate that the embodiments and aspects depicted are illustrative and that variations of those shown, as well as other embodiments and aspects described herein, may be envisioned and practiced within the scope of the present disclosure.

DETAILED DESCRIPTION

The present invention relates generally to downhole power generation systems and methods and, more particularly, to downhole power generation systems and methods that utilize a variable-output generator to generate electrical power.

The disclosed embodiments allow generation of an adjustable amount of electrical power to occur over a range of mud flow rates during a downhole drilling operation. As such, the flow rate of the mud (e.g., drilling fluid) can be adjusted according to one set of operational criteria, for example, to achieve consistent and efficient borehole drilling, while the amount of electrical power generated by the disclosed systems and methods can independently be adjusted to accommodate the power requirements of downhole equipment that relies upon the systems and methods for electrical power.

The disclosed embodiments allow the amount of electrical power being generated downhole to be adjusted without pulling the power-producing generator or system out of the borehole. Thus, electrical power generation can be maintained downhole despite changes or fluctuations in the mud flow rate. In some embodiments, an increased amount of electrical power can be generated while the mud flow rate remains unchanged. Those skilled in the art will readily recognize that eliminating the need to pull the power-producing generator or system from the borehole in order to adjust its output configuration may result in less drilling downtime and, therefore, reduced operational costs.

The disclosed embodiments can also reduce the generation of downhole electrical power generation when appropriate. As known in the art, generators produce power by rotating a magnet with respect to a coil, and the power output therefrom is a function of the rotational rate of the magnet relative to the coil. With typical downhole power generators, the power output cannot be varied except by varying the rotational rate of the magnet relative to the coil, which frequently is accomplished by varying the mud flow rate. In cases where the mud flow rate must be maintained at a relatively high level for a particular application, a typical power generator may turn faster than desired and, therefore, generate more power than required. This excess power is typically dissipated as heat, thereby increasing the ambient temperatures in the borehole and potentially having a detrimental effect on the electronic equipment forming part of the drill string.

The disclosed embodiments provide a generator in which the location of a rotating magnet assembly (rotor) with respect to a coil assembly (stator) arranged within the generator can be varied while the magnet assembly continues to rotate. The power output is changed as the rotating magnet assembly is moved with respect the coil assembly.

FIG. 1 illustrates a land-based oil and gas rig 100 including a downhole power generator 200 that may be employed to provide power to one or more downhole electronics, equipment, or tools, according to one or more embodiments. It should be noted that, even though FIG. 1 depicts a land-based oil and gas rig 100, it will be appreciated by those skilled in the art that the exemplary downhole power generator 200, and its various embodiments disclosed herein, are equally well suited for use in or on other types of oil and gas rigs, such as offshore platforms or rigs, or rigs arranged in any other geographical location.

As illustrated in FIG. 1, a drilling platform 102 supports a derrick 104 having a traveling block 106 for raising and lowering a drill string 108. A kelly 110 supports the drill string 108 as it is lowered through a rotary table 112. The kelly 110 may be, for example, a four or six-sided pipe configured to transfer rotary motion to a turntable 130 and the drill string 108. A drill bit 114 is driven either by a downhole motor and/or via rotation of the drill string 108 from the drilling platform 102 and may include one or more drill collars 126 and 128 arranged at or near the drill bit 114. As the bit 114 rotates, it creates a borehole 116 that passes through various subterranean formations 118. A pump 120 circulates drilling fluid (e.g., mud) through a feed pipe 122 to the kelly 110, which conveys the drilling fluid downhole through an interior conduit in the drill string 108 and through one or more orifices in the drill bit 114. The drilling fluid is then circulated back to the surface via the annulus defined between the drill string 108 and the borehole 116 where it is eventually deposited in a retention pit 124. The drilling fluid transports cuttings and debris derived from the borehole 116 into the retention pit 124 and aids in maintaining the integrity of the borehole 116.

FIG. 1 also shows a downhole electronics module 340 located within the drill string 108 as an example of local downhole equipment or tools. In some embodiments, one or more downhole equipment or tools characterized by the downhole electronics module 340 may include, but are not limited to, a Measurement-While-Drilling (MWD) sensor, a Logging-While-Drilling (LWD) sensor, a Magnetic Resonance Imaging (MRI) tool, a Nuclear Magnetic Resonance (NMR) tool, an electromagnetic (EM) telemetry tool, positive or negative mud pulsers, a Pressure-While-Drilling (PWD) sensor, a resistivity sensor, combinations thereof, and the like. These tools and services enable the capture and/or recording of various critical measurements, along with transmitting such data to the surface, while drilling the borehole 116. The data gained from these measurements make it possible to evaluate the formation, maximize drilling performance and help ensure precise wellbore placement, thereby helping to reduce time and costs. In one or more embodiments, the downhole electronics module 340 and its accompanying downhole equipment and/or tools can be provided with electrical power using, for example, the downhole power generator 200.

Figure 2A:
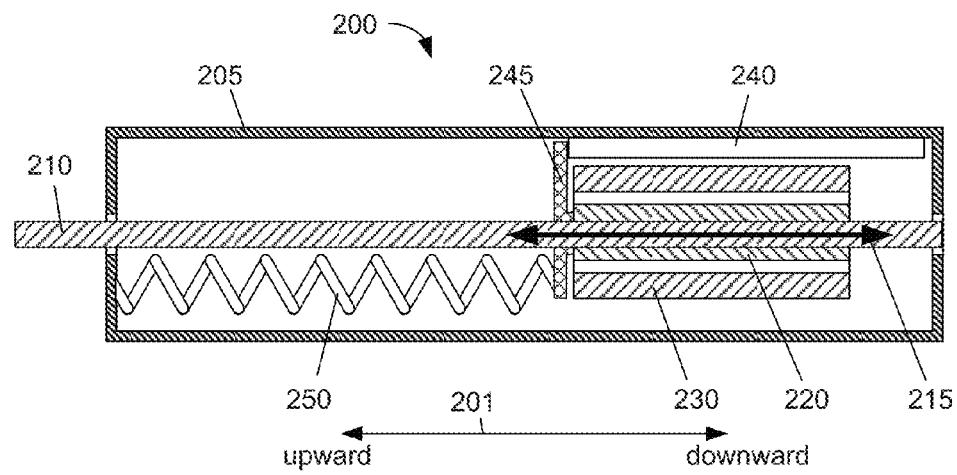
FIG. 2A depicts an exemplary variable-output power generator, according to one or more embodiments of the disclosure.

Referring now to FIG. 2A, with continued reference to FIG. 1, illustrated is an exemplary embodiment of the downhole power generator 200, according to one or more embodiments of the disclosure. In at least one embodiment, the downhole power generator 200 may be characterized as a variable-output generator. In some embodiments, the downhole power generator 200 may include a housing 205 and an input shaft 210 movably arranged within the housing 205. As will be discussed in greater detail below, the input shaft 210 may be communicably coupled or otherwise connected to a power source 320 (FIG. 4), such as a motor driven by, for example, the drilling fluid (e.g., mud) that circulates through the drill string 108. A rotor in the form of a magnet assembly 220 is attached to the input shaft 210 and configured to rotate synchronously with the shaft 210. A stator in the form of a coil assembly 230 generally surrounds the magnet assembly 220 and is attached to the housing 205 such that the magnet assembly 220 can rotate with respect to the coil assembly 230. The coil assembly 230 has a longitudinal axis 215 that defines or otherwise provides an axis of rotation for the magnet assembly 220. Those skilled in the art will recognize that for the embodiment depicted in FIG. 2A as well as for other embodiments disclosed herein, the locations of the stator and the rotor can be reversed. For example, the stator could be positioned inside the rotor such that the rotor generally surrounds the stator. Those skilled in the art will also recognize that the coil assembly 230 could be configured as the rotor and the magnet assembly 220 could be configured as the stator. These and other variations, taken alone or in combination, all fall within the spirit and scope of the present disclosure.

In operation, the magnet assembly 220 may magnetically interact with the coil assembly 230 such that rotation of the magnet assembly 220 within the coil assembly 230 results in the generation of electrical power or current within the coil assembly 230. This power may be conveyed or otherwise provided to the downhole electronics module 340 (FIG. 1) via an output 265 (FIG. 3) in communication with the coil assembly 230. As will be appreciated by those skilled in the art, the amount of power generated is at least partially dependent upon the rotational velocity of the magnet assembly 220 with respect to the coil assembly 230.

In the example embodiment of FIG. 2A, a biasing element 250 may be disposed within the housing 205 and engage the housing 205 and a plunger 245 coupled or otherwise attached to the magnet assembly 220. As illustrated, the biasing element 250 is depicted as a compression spring, but the biasing element 250 may equally be a solenoid, an electromechanical actuator, a piston (e.g., hydraulic, electromechanical, etc.), combinations thereof, or the like, without departing from the scope of the disclosure. In exemplary operation, the biasing element 250 may be configured to urge the magnet assembly 220 in a first direction along the longitudinal axis 215. In the example embodiment of FIG. 2A, an upward-downward direction is defined as shown by arrow 201, and the biasing element 250 may be configured to urge the magnet assembly 220 in the downward direction.

In some embodiments, an actuator 240 may also be disposed within the housing 205 and coupled or otherwise attached to both the housing 205 and the plunger 245. As illustrated, the actuator 240 is depicted as a hydraulic cylinder or piston, and may be selectably actuated by provision of pressurized hydraulic fluid thereto. In other embodiments, however, the actuator 240 may be an electrically actuated solenoid or piston and selectably actuated by provision of electrical power thereto, without departing from the scope of the disclosure. In operation, the actuator 240 may be configured to urge the magnet assembly 220 in a second direction opposite to the first direction along the longitudinal axis 215. In the example embodiment of FIG. 2A, the actuator 240 may selectably urge the magnet assembly 220 in the upward direction, as indicated by the arrow 201. In one or more embodiments, the biasing element 250 may be omitted from the downhole power generator 200 and the actuator 240 may be configured to move the magnet assembly 220 in both the upward and downward directions along the longitudinal axis 215.

Figure 2B:
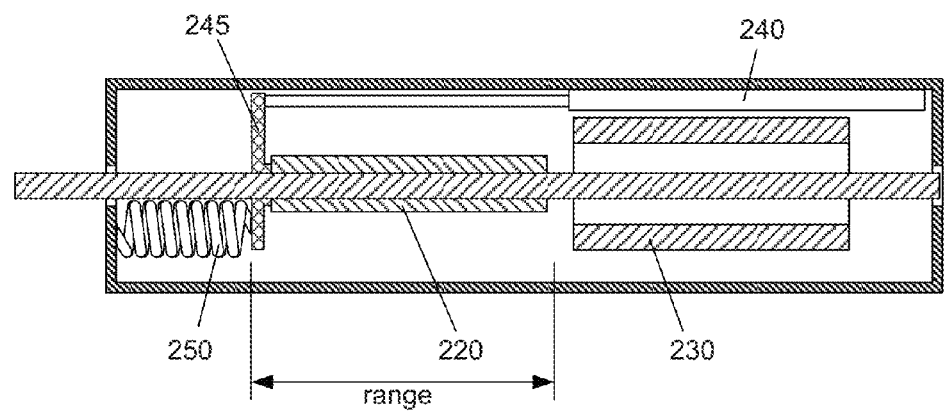
FIG. 2B depicts a disengaged configuration of the power generator of FIG. 2A, according to one or more embodiments of the disclosure.

The cooperative biasing forces generated by the biasing element 250 and the actuator 240 may serve to selectively move the downhole power generator 200 between engaged and disengaged positions. As shown in FIG. 2A, the downhole power generator 200 is depicted in an engaged position where the magnet assembly 220 is disposed in a first axial position along the longitudinal axis 215. With the magnet assembly 220 in its first axial position, the electromagnetic interaction between the magnet assembly 220 and the coil assembly 230 is maximized, thereby maximizing the power output from the coil assembly 230 for a given rotational velocity of the magnet assembly 220. The biasing element 250 may be configured to urge the magnet assembly 220 toward the first axial position, thereby placing the downhole power generator 200 in its engaged position. In one or more alternate embodiments, the biasing element 250 may urge the magnet assembly 220 away from the first axial position, thereby urging the downhole power generator 200 toward its disengaged position (FIG. 2B). In such an embodiment, the biasing element 250 may be, for example, a coil spring, a solenoid, an electromechanical actuator, or the like.

FIG. 2B depicts the downhole power generator 200 in its disengaged configuration, according to one or more embodiments of the disclosure. As illustrated, the actuator 240 is axially extended and the biasing element 250 is axially compressed, whereby the magnet assembly 220 is moved into a second axial position along the longitudinal axis 215. In this position, the magnetic coupling or interaction between the magnet assembly 220 and the coil assembly 230 is minimized, thereby substantially reducing or completely eliminating the power output of the downhole power generator 200. As will be appreciated, by selective actuation of the actuator 240 the magnet assembly 220 may be moved or otherwise axially translated to any position ranging between the first and second axial positions, which correspond to the engaged and disengaged positions of the downhole power generator 200, respectively.

Figure 2C:
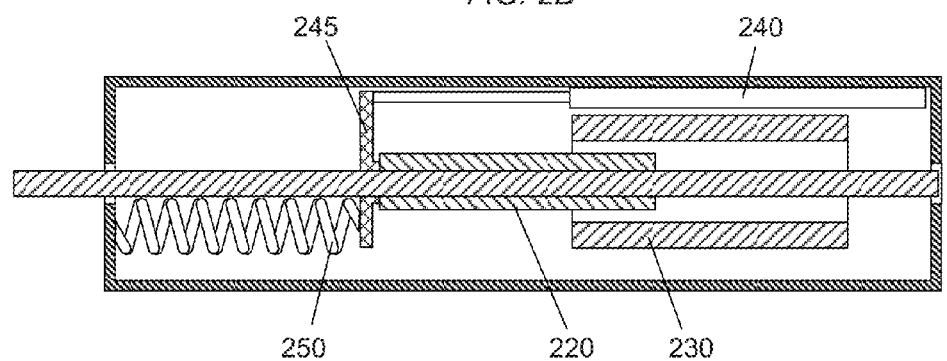
FIG. 2C depicts the power generator of FIG. 2A configured to produce a reduced amount of power, according to one or more embodiments of the disclosure.

For example, FIG. 2C depicts the downhole power generator 200 configured to produce a reduced amount of power, according to one or more embodiments of the disclosure. In this configuration, the actuator 240 has urged the magnet assembly 220 to an intermediate axial position between the first and second axial positions or the engaged and disengaged positions. As the actuator 240 extends, the biasing element 250 is compressed, thus increasing the force applied by the biasing element 250, and the magnet assembly 220 moves along the longitudinal axis 215 in the upward direction. In embodiments where the actuator 240 is a hydraulic actuator, the position of the magnet assembly 220 is dependent upon the hydraulic fluid pressure provided to the actuator 240. As the magnet assembly 220 moves away from the first axial position and toward the second axial position, the force applied by the biasing element 250 gradually increases. The magnet assembly 220 can be moved to a selected position between the first and second axial positions by applying a predetermined amount of force with the actuator 240 designed to balance the counteracting force exhibited by the biasing element 250 at the selected position. As will be appreciated, the magnet assembly 220 may be moved to any axial position between the first and second axial positions by providing a corresponding amount of hydraulic fluid pressure associated with that axial position.

In an alternative embodiment (not illustrated), the corresponding function and position of the biasing element 250 and the actuator 240 may be swapped within the downhole power generator 200. Accordingly, when the downhole power generator 200 is in its engaged position and operating at full capacity (e.g., the magnet assembly 220 is in the first axial position, as shown in FIG. 2A), the biasing element 250 may be in a fully compressed state and the actuator 240 may be in an axially extended state. In this configuration, the magnet assembly 220 may be configured to move out of magnetic interaction with the coil assembly 230 when the actuator 240 is de-actuated, thereby causing power generation to be reduced or terminated. When the actuator 240 is re-actuated and extended axially once more, the biasing element 250 compresses axially and the output of the power generator 200 increases towards its full operation capacity.

In another alternative configuration (not illustrated), the biasing element 250 is not present and the actuator 240 is configured to controllably move in both axial directions. For example, the actuator 240 may be a double-acting hydraulic cylinder with the magnet assembly 220 attached to the cylinder rod end. The position of the magnet assembly 220 can be controlled solely by the hydraulics of the actuator 240 without requiring an opposing force, such as provided by the biasing element 250, to move the magnet assembly 220 in one of the two directions.

In still other alternative configurations (not illustrated), the actuator 240 and biasing element 250 (if present) may be configured to controllably move the coil assembly 230 instead of the magnet assembly 220. In such embodiments the magnet assembly 220 may rotate while remaining substantially axially fixed, and the coil assembly 230 may remain substantially rotatably fixed while moving axially with respect to the magnet assembly 220 between first, second, and intermediate positions. As will be appreciated, the coil assembly 230 may be moved to any axial position between the first and second axial positions by appropriately operating the actuator 240.

Figure 2D:
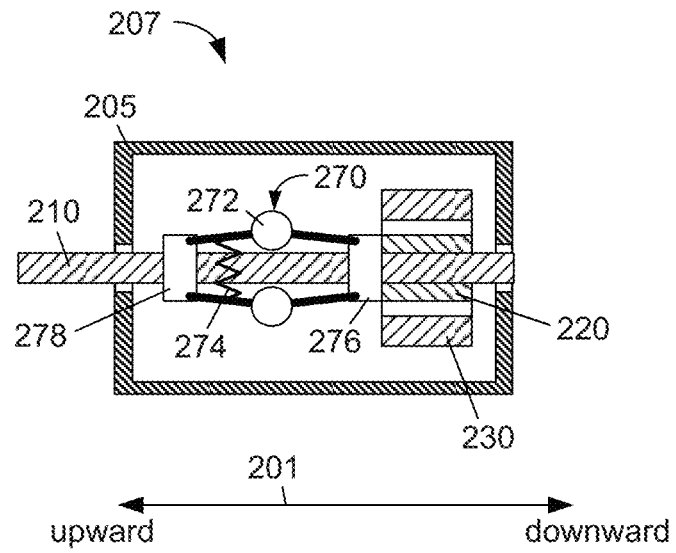
FIGS. 2D and 2E depict another downhole power generator, according to one or more embodiments.
Figure 2E:
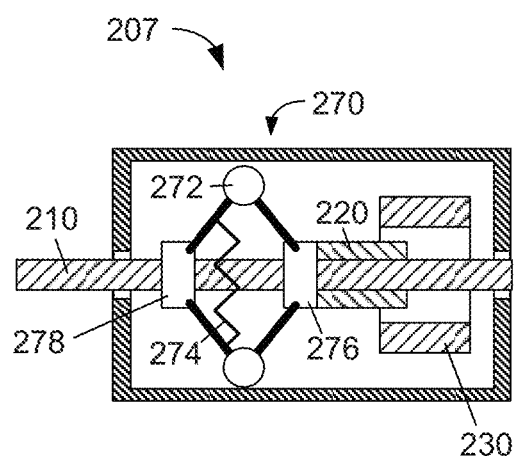

FIGS. 2D and 2E depict another downhole power generator 207, according to one or more embodiments. Specifically, FIGS. 2D and 2E depict the downhole power generator 207 in its engaged and partially disengaged positions, respectively. The downhole power generator 207 may be similar to the downhole power generator 200 of FIGS. 2A-2C and therefore may be best understood with reference thereto, where like numerals indicate like elements that will not be described again in detail. As illustrated, the downhole power generator 207 may include a centrifugal governor 270 that provides a plurality of centrifugal weights 272 attached by linkages to a fixed collar 278 and a sliding collar 276. The sliding and fixed collars 276, 278 effectively couple the centrifugal weights to the input shaft 210, where the sliding collar 276 is movably attached to the input shaft 210 and the fixed collar 278 is fixed to the input shaft 210. The sliding collar 276 may also be attached to the magnet assembly 220, and movable therewith.

As the rotational rate of the input shaft 210 increases, the centrifugal weights 272 of the centrifugal governor 270 are forced radially outward, thereby simultaneously moving the magnet assembly 220 axially away from the coil assembly 230 via the interconnecting linkages. The downhole power generator 207 may also include a return spring 274 coupled to the linkages and configured to provide a compressive force on the linkages that urge the centrifugal weights 272 back towards the axis of rotation. In operation, as the centrifugal weights 272 move outward, the return spring 274 is extended or stretched and a return force is exhibited by the return spring 274 that balances the additional centrifugal force created by the increased rotational velocity.

FIG. 2E depicts the downhole power generator 207 while the input shaft is rotating at an increased rotational velocity. It can be seen how the sliding collar 276 has been drawn upward along the input shaft 210 by the outward motion of the centrifugal weights 272, thereby moving the magnet assembly 220 partially out of the coil assembly 230. Once the rotational velocity of the input shaft 210 slows, the return spring 274 may be configured to return the magnet assembly 220 to its former radial position as the centrifugal force created by the spinning centrifugal weights 272 decreases, thus returning the centrifugal governor 270 to the engaged position, as shown in FIG. 2D.

Figure 2F:
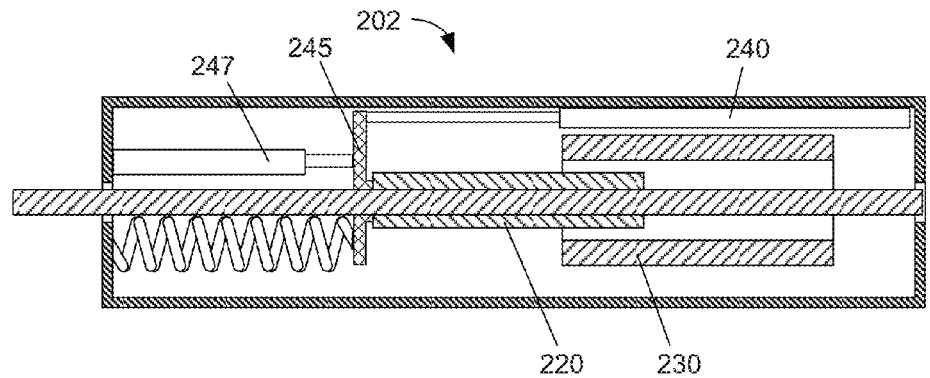
FIG. 2F depicts another embodiment of a power generator, according to one or more embodiments of the disclosure.

FIG. 2F depicts another embodiment of a power generator 202, according to one or more embodiments of the disclosure. The power generator 202 includes a position sensor 247 that may be, in certain embodiments, a linear potentiometer. The position sensor 247 may be coupled to the power control module 260 (FIG. 3) so as to provide a feedback signal on the actual displacement of the magnet assembly 220, thereby closed-loop control of the position of the magnet assembly 220 compared to the power control module 260 positioning the magnet assembly without feedback.

Figure 2G:
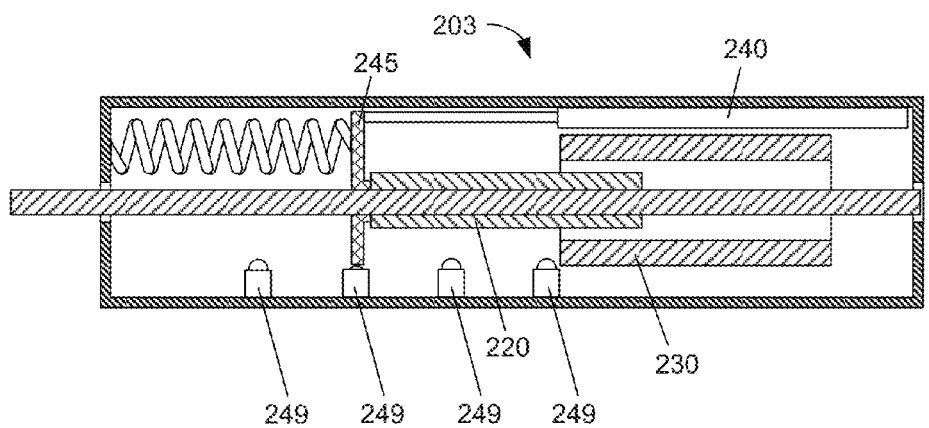
FIG. 2G depicts another embodiment of a power generator, according to one or more embodiments of the disclosure.

FIG. 2G depicts another embodiment of a power generator 203, according to one or more embodiments of the disclosure. The power generator 203 includes one or more position-detection switches 249 configured to determine whether the magnet assembly 220 is positioned at a certain offset from the coil assembly 230. In one or more embodiments, the left-most position-detection switch 249 determines when the magnet assembly 220 has reached its maximum offset from the coil assembly 230. In one or more embodiments, the leftmost position-detection switch 249 may be connected to the power control module 260 and the power control module 260 configured to decouple the power source 320 (FIG. 3) from the magnet assembly 220 by, for example, disengaging a clutch (327 in FIG. 4) so as to allow the power source 320 to continue to rotate while allowing the magnet assembly 220 to slow down and eventually stop.

Figure 2H:
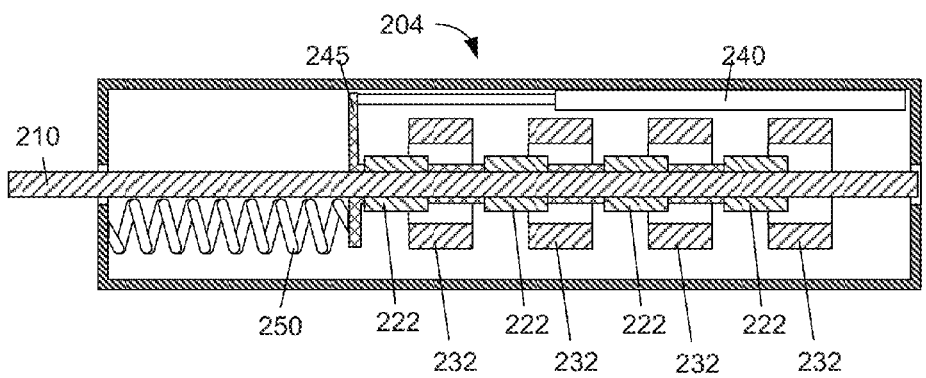
FIG. 2H depicts another embodiment of a power generator, according to one or more embodiments of the disclosure.

FIG. 2H depicts another embodiment of a power generator 204, according to one or more embodiments of the disclosure. This embodiment includes a plurality of small magnet assemblies 222 in place of the single magnet assembly 220 of FIGS. 2A-2C. In the example of FIG. 2H, there are four magnet assemblies 222 respectively disposed in four coil assemblies 232. In the example of FIG. 2H, the four magnet assemblies 222 are mounted on the input shaft 210 and configured to rotate synchronously but also axially translate with movement of a common plunger 245 so that the four magnet assemblies move as one under the urging of biasing element 250 and actuator 240. In one or more embodiments, each magnet 222 is mounted on its own individual plunger (not shown in FIG. 2H) with respective biasing elements and actuators (not shown in FIG. 2H).

Figure 3:
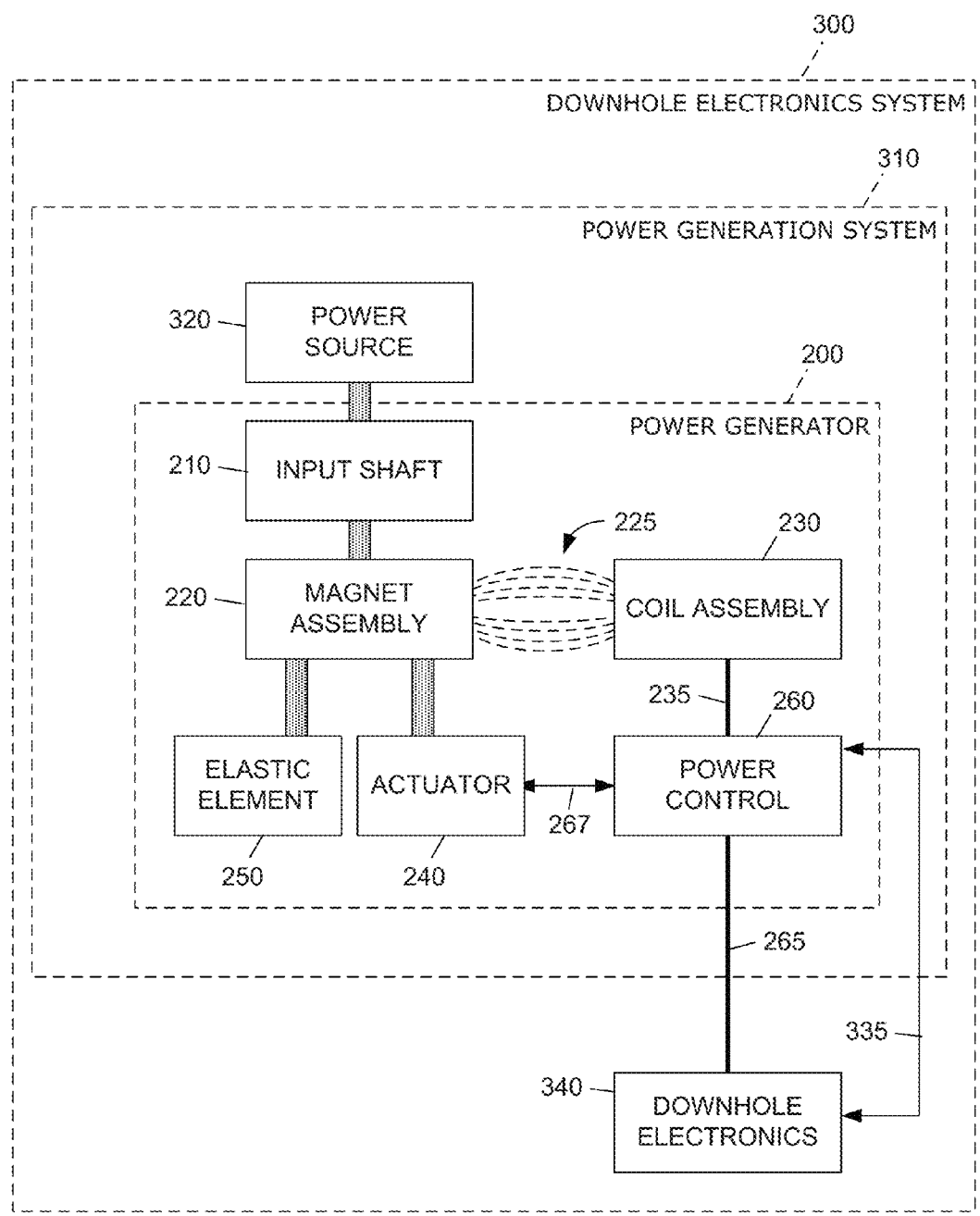
FIG. 3 is a block diagram of a downhole electronics system, according to one or more embodiments of the disclosure.

FIG. 3 is a block diagram of a downhole electronics system 300, according to one or more embodiments of the disclosure. The downhole electronics system 300 includes a power generation system 310 that includes a power source 320 coupled to the downhole power generator 200. As discussed above, the downhole power generator 200 may be configured to provide electrical power over a system output 265 to the downhole equipment and/or tools of the downhole electronics module 340.

Figure 4:
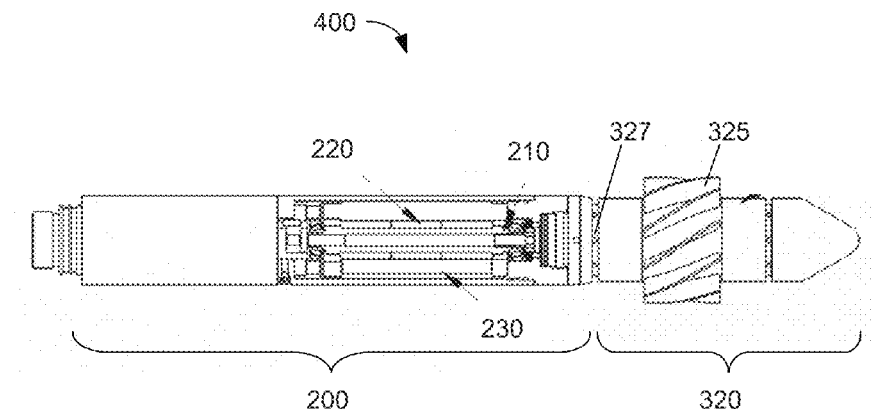
FIG. 4 illustrates an example downhole power assembly that includes a downhole power generation system and a power source, according to one or more embodiments of the disclosure.

The input shaft 210 of the power generator 200 may be mechanically or otherwise communicably coupled to the power source 320 at one end and mechanically or otherwise communicably coupled to the rotor, e.g. the magnet assembly 220, at its opposing end. In some embodiments, the power source 320 may include, but is not limited to, a mud turbine 325 (FIG. 4). A magnetic field 225 couples the magnet assembly 220 to the coil assembly 230. When the magnet assembly 220 is rotating, electrical power is provided via an output 235 to a power control module 260. In one or more embodiments, the power control module 260 may accept power on the output 235 and provide the received power to the downhole electronics module 340 via the system output 265. In operation, the power control module 260 may be configured to provide voltage control and waveform conversion, for example, from alternating current (AC) to direct current (DC), or from a speed-dependent AC frequency to a fixed operational AC frequency.

The downhole electronics system 300 may also include a communication link 335 configured to communicably couple the downhole electronics module 340 to the power control module 260. In exemplary operation, the downhole electronics module 340 may communicate with the power control module via the communication link 335 and thereby convey information related to an amount of power required to operate one or more associated downhole equipment and/or tools. In turn, the power control module 260 may be configured to provide command signals via an actuator communication link 267 to the actuator 240. In response to the command signals received from the power control module 260, the actuator 240 may be configured to move the magnet assembly 220 (or, in alternative configurations, the coil assembly 230) to a selected axial position, as generally described above, thereby resulting in the coil assembly 230 providing an appropriate amount of power for the requirements of the particular downhole equipment and/or tool(s).

Referring now to FIG. 4, with continued reference to the preceding figures, illustrated is an exemplary downhole power assembly 400, according to one or more embodiments. As illustrated, the downhole power assembly 400 may include the downhole power generator 200 and the power source 320, as generally described above. As briefly mentioned above, the power source 320 may include a mud turbine 325 communicably coupled or otherwise connected to the input shaft 210. In exemplary use, the downhole power assembly 400 may be positioned within the drill string 108 (FIG. 1) such that the drilling fluid (e.g., mud) that is pumped down the drill string 108 forces or otherwise causes the blades of the turbine 325 to rotate, thereby rotating the input shaft 210 which results in the simultaneous rotation of the magnet assembly 220 within the coil assembly 230. In one or more embodiments, a clutch 327 may be coupled between the turbine 325 and the input shaft 210. In one or more embodiments, when a safety limit is reached, such as the leftmost position-sensing switch 249 of FIG. 2G being activated, the clutch may disengage so that the turbine 325 can continue to rotate with the drilling fluid flowing past and the power generator 200 is prevented from running at excessive speed, thus preventing damage to the power generator 200.

These and other embodiments of the downhole power assembly 400 may allow the flow rate of the drilling fluid, e.g., mud, to be varied as required for other aspects of the drilling process while autonomously or selectively adjusting the downhole power generator 200 to maintain the proper amount of power required to operate one or more downhole equipment and/or tools.

Figure 5:
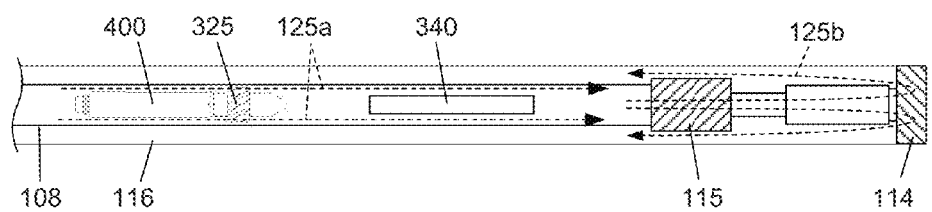
FIG. 5 depicts a cross-sectional view of a lower portion of an exemplary drill string, according to one or more embodiments.

FIG. 5 depicts a cross-sectional view of a lower portion of the exemplary drill string 108, according to one or more embodiments. As illustrated, the downhole power assembly 400 and the downhole electronics module 340 may be arranged within the drill string 108 and axially adjacent to each other. A mud motor 115 may be coupled to the lower end of the drill string 108 and configured to receive the drilling fluid in order to drive the drill bit 114. A flow of mud flows down through the drill string 108 as indicated by the dashed arrows 125*a* and then through the mud motor 115 and is eventually exhausted into the annular space defined between the drill string 108 and the borehole 116 as indicated by dashed arrows 125*b*. The mud then flows back to the surface, as discussed with respect to FIG. 1.

As the mud flows past the turbine 325, as briefly noted above, the blades of the turbine 325 are caused to rotate, thereby resulting in power generation by the downhole power assembly 400. The generated electrical power may then be conveyed or otherwise provided to the downhole electronics module 340 via the system output 265 (FIG. 3), as described above.

It will be apparent to those of skill in the art that the position of the downhole power assembly 400 can be adjusted within the drill string 108 without significant effect on its performance and that the various components of the disclosed systems may be integrated, separated, or rearranged without departing from the scope of this disclosure. For example, the input shaft 210 may be coupled through gearing to the mud motor 115 in place of the mud-driven turbine 325.

Figure 6:
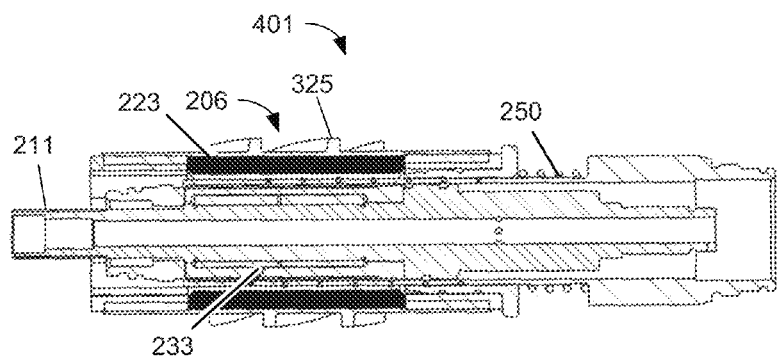
FIG. 6 depicts a cross-sectional view of another example embodiment of a downhole power generation system that includes a power generator driven by a turbine, according to one or more embodiments.

FIG. 6 depicts a cross-sectional view of another example embodiment of a downhole power generation system 401 that includes a power generator 206 driven by a turbine 325, according to one or more embodiments. In this embodiment, the coil assembly 233 is mounted to a fixed shaft 211 and the magnet assembly 223 is mounted directly to the turbine 325 and rotates about the coil assembly 233. The biasing element 250 has been relocated, in this example, to an exterior location.

As highlighted by FIG. 6, while some exemplary embodiments illustrated and described herein depict a rotating inner magnet assembly positioned within a rotatably fixed outer coil assembly, the arrangement of the components can be reversed without departing from the spirit and scope of the present disclosure. Moreover, while the exemplary embodiments illustrated and described herein depict axially adjusting the relative location of the magnet assembly 220 and the coil assembly 230, similar results also may be obtained by radially adjusting the relative location of the magnet assembly 220 and the coil assembly 230 to increase the distance between, and thereby reduce the power generating capacity of, the magnets and the coils. For example, the magnet assembly 220 could be mounted on a radially expandable mandrel configured to move the magnets of the magnet assembly radially outwardly into close proximity with the coils when more electrical power is needed, and configured to pull the magnets radially inwardly, further from the coils, when less electrical power is needed.

From the foregoing description and accompanying drawings, it can be appreciated that the present invention provides for downhole power generation wherein the output power is varied or optimized for a given load and a given input power, for example the flow rate of the mud. For instance, the output of a particular electrical generator can be changed to compensate for changes to the mud flow rate that are required for proper operation of the drill. This can allow the generator to provide a constant power over a range of mud flow rates. The power generation provided can also allow for a wider operational range for a given mechanical configuration, as opposed to previous techniques that may require changing of turbines, nozzles, and/or gears for different operational parameters encountered in a given downhole environment.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of downhole power generation, comprising:
    rotating a magnet assembly about an axis relative to a coil assembly at a first rotational velocity, the magnet assembly and the coil assembly being positioned within a housing and the magnet assembly being coupled to a plunger movable within the housing;
    axially moving the magnet assembly in a first direction to a first position on the axis with a configurable actuator coupled to the housing at one end of the configurable actuator and coupled to the plunger at an opposing end of the configurable actuator;
    adjusting a magnetic interaction between the magnet assembly and the coil assembly as the magnet assembly moves to the first position;
    biasing the magnet assembly in a second direction opposite the first direction with a biasing element coupled to the housing and the plunger; and
    providing a power output from the coil assembly at a first power output level corresponding to the first position while the magnet assembly is rotating at the first rotational velocity.

2. The method of downhole power generation of claim 1, further comprising providing a fluid at a selected pressure to the configurable actuator and thereby applying a force to the magnet assembly in the first direction, the force having a magnitude corresponding to the selected pressure.

3. The method of downhole power generation of claim 1, wherein the magnet assembly is movable on the axis within a range of positions, the range comprising an engaged position at one end of the range and a disengaged position at the other end of the range, and wherein the biasing element is configured to urge the magnet assembly toward one of the engaged end and the disengaged end and the actuator is configured to urge the magnet assembly toward the other of the engaged end and the disengaged end.

4. The method of downhole power generation of claim 1, further comprising:
    rotating the magnet assembly at a second rotational velocity, the second rotational velocity being different than the first rotational velocity;
    axially moving the magnet assembly to a second position on the axis with respect to the coil assembly; and
    maintaining the power output from the coil assembly at the first power output level while the magnet assembly is rotating at the second rotational velocity.

5. The method of downhole power generation of claim 1, wherein rotating the magnet assembly about the axis comprises rotating an input shaft that is coincident with the axis using input power from a power source, wherein the magnet assembly is coupled to the input shaft such that the magnet assembly rotates synchronously with the input shaft while being able to translate axially along the axis.

6. The method of downhole power generation of claim 5, wherein the power source comprises a downhole motor, the method further comprising driving the downhole motor with a flow of mud.

7. The method of downhole power generation of claim 1, further comprising:
    providing the power output from the coil assembly to a downhole electrical module.

8. The method of downhole power generation of claim 7, further comprising:
    communicating a control signal with the downhole electrical module to a power control module communicably coupled to the coil assembly, the control signal comprising information related to an amount of power required to operate one or more downhole equipment and/or tools associated with the downhole electrical module;
    communicating a command signal corresponding to the control signal to the configurable actuator with the power control module; and
    moving the magnet assembly to a selected axial position on the axis and thereby providing the amount of power required to operate the one or more downhole equipment and/or tools.

9. A downhole power generator, comprising:
    a coil assembly arranged about a longitudinal axis within a housing and having a power output exhibiting a power output level;
    a magnet assembly movably arranged within the housing with respect to the coil assembly and coupled to a plunger axially movable within the housing, the magnet assembly being configured to rotate about the longitudinal axis at a rotational velocity and to translate axially along the longitudinal axis within a range of positions;
    an actuator coupled to the housing at one end of the actuator and to the plunger at an opposing end of the actuator; and
    a biasing element coupled to the housing and the plunger,
    wherein the actuator is configured to urge the magnet assembly in at least a first direction along the longitudinal axis and further configured to move the magnet assembly to any axial position within the range,
    wherein the biasing element biases the magnet assembly in a second direction opposite the first direction, and
    wherein the power output level depends at least partially on an axial position of the magnet assembly.

10. The power generator of claim 9, wherein the magnet assembly comprises a plurality of magnets, and wherein none of the plurality of magnets is movable relative to each other.

11. The downhole power generation system of claim 9, wherein the power output level corresponds to a first power output level when the magnet assembly is rotating at a first rotational velocity and disposed at a first axial position within the range.

12. The downhole power generation system of claim 11, wherein the power output level also corresponds to the first power output level when the magnet assembly is rotating at a second rotational velocity and disposed at a second axial position within the range.

13. The downhole power generation system of claim 11, wherein the power output level corresponds to a second power output level when the magnet assembly is rotating at the first rotational velocity and disposed at a second position within the range.

14. The power generator of claim 9, wherein the range comprises an engaged position at one end of the range and a disengaged position at an opposing end of the range, the biasing element being configured to urge the magnet assembly away from the engaged position and toward the disengaged position.

15. The power generator of claim 9, wherein the range comprises an engaged position at one end of the range and a disengaged position at an opposing end of the range, the biasing element being configured to urge the magnet assembly away from the disengaged position and toward the engaged position.

16. The power generator of claim 9, further comprising an input shaft coincident with the longitudinal axis and configured to rotate at the rotational velocity, wherein the magnet assembly is disposed on the input shaft and configured to synchronously rotate with the input shaft, the input shaft being driven by a power source.

17. The power generator of claim 16, wherein the power source comprises a turbine driven by a flow of mud.

18. The power generator of claim 9, further comprising:
a downhole electrical module communicably coupled to the power output; and
a power control module communicably coupled to the downhole electronics module via the power output, the downhole electronics module being configured to communicate to the power control module a control signal comprising information related to an amount of power required to operate one or more downhole equipment and/or tools associated with the downhole electrical module.

19. The power generator of claim 18, wherein the one or more downhole equipment and/or tools comprises one or more of a Measurement-While-Drilling (MWD) sensor, a Pressure-While-Drilling (PWD) sensor, a Logging-While-Drilling (LWD) sensor, a Magnetic Resonance Imaging (MRI) tool, a Nuclear Magnetic Resonance (NMR) tool, an electromagnetic (EM) telemetry tool, a positive or negative mud pulser, and a resistivity sensor.

20. A downhole power generation system comprising:
a mud-driven power supply positioned along a drill string and operable to rotate in response to a flow of drilling mud through the drill string;
a rotor coupled for rotation with the power supply and having a magnet assembly coupled thereto and rotatable within a housing, wherein a plunger is coupled to the magnet assembly and axially movable within the housing;
a stator including a coil assembly positioned within the housing and arranged relative to the rotor such that rotation of the rotor with respect to the stator generates an electrical power output; and
an actuator coupled to the housing at one end of the actuator and to the plunger at an opposing end of the actuator and operable to change a relative position of the rotor and the stator with respect to one another to adjust the electrical power output without interrupting rotation of the rotor with respect to the stator.

21. The method of downhole power generation of claim 1, further comprising:
axially moving the magnet assembly to a second position on the axis with respect to the coil assembly; and
changing the power output from the coil assembly from the first power output level to a second power output level while the magnet assembly is rotating at the first rotational velocity.

* * * * *